US009231996B2

(12) United States Patent
Chakra et al.

(10) Patent No.: US 9,231,996 B2
(45) Date of Patent: Jan. 5, 2016

(54) USER-INFLUENCED PAGE LOADING OF WEB CONTENT

(71) Applicant: International Business Machines Corporation, Armonk, NY (US)

(72) Inventors: Al Chakra, Apex, NC (US); John A. Feller, Cary, NC (US); Trudy L. Hewitt, Cary, NC (US); Francesco C. Schembari, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 13/861,692

(22) Filed: Apr. 12, 2013

(65) Prior Publication Data

US 2014/0310395 A1 Oct. 16, 2014

(51) Int. Cl.
 *H04L 12/26* (2006.01)
 *H04L 29/08* (2006.01)

(52) U.S. Cl.
 CPC .............. *H04L 67/02* (2013.01); *H04L 67/22* (2013.01)

(58) Field of Classification Search
 CPC . G06F 17/30899; H04L 67/02; H04L 67/142; H04L 67/22; H04L 67/306; H04L 43/08; H04L 67/04; H04L 67/2814
 USPC .......... 702/127, 186; 707/E17.119; 709/224, 709/229, 203–205, 217–219, 223, 225
 See application file for complete search history.

(56) References Cited

U.S. PATENT DOCUMENTS

| | | | | |
|---|---|---|---|---|
| 5,727,129 | A * | 3/1998 | Barrett et al. | 706/10 |
| 6,300,947 | B1 * | 10/2001 | Kanevsky | 715/866 |
| 6,691,106 | B1 | 2/2004 | Sathyanarayan | |
| 6,839,680 | B1 * | 1/2005 | Liu et al. | 705/7.33 |
| 8,156,441 | B1 * | 4/2012 | Bihari et al. | 715/748 |
| 8,176,416 | B1 * | 5/2012 | Williams et al. | 715/243 |
| 8,706,802 | B1 * | 4/2014 | Dayan et al. | 709/203 |
| 8,893,014 | B1 * | 11/2014 | Au et al. | 715/745 |
| 2003/0025728 | A1 * | 2/2003 | Ebbo et al. | 345/744 |
| 2005/0066011 | A1 * | 3/2005 | Wicks | 709/217 |
| 2005/0071758 | A1 * | 3/2005 | Ehrich et al. | 715/513 |
| 2007/0150234 | A1 * | 6/2007 | Wicks | 702/182 |
| 2007/0192485 | A1 * | 8/2007 | McMahan et al. | 709/225 |
| 2008/0214153 | A1 * | 9/2008 | Ramer et al. | 455/414.1 |
| 2009/0013034 | A1 | 1/2009 | Cheng et al. | |
| 2009/0248996 | A1 * | 10/2009 | Mandyam et al. | 711/154 |
| 2009/0249359 | A1 * | 10/2009 | Caunter et al. | 719/315 |
| 2009/0327913 | A1 * | 12/2009 | Adar et al. | 715/745 |
| 2009/0327914 | A1 * | 12/2009 | Adar et al. | 715/745 |
| 2010/0138423 | A1 * | 6/2010 | Moore et al. | 707/741 |
| 2011/0276917 | A1 * | 11/2011 | Error | 715/781 |
| 2012/0030341 | A1 * | 2/2012 | Jensen et al. | 709/224 |

(Continued)

OTHER PUBLICATIONS

Zeus Technology, "ZXTM: Traffic Valuation and Prioritization with ZXTM", 2006, 19 pages, Zeus Technology.

(Continued)

*Primary Examiner* — Ruolei Zong
(74) *Attorney, Agent, or Firm* — Jordan IP Law, LLC

(57) ABSTRACT

Methods and systems may provide for identifying a usage pattern for web content having a plurality of components and receiving a web response from a server, wherein the web response includes the web content. Additionally, a client-side override of the load order of the plurality of components may be conducted based on the usage pattern. In one example, a cookie is generated based on the usage pattern, wherein the cookie is used to conduct the client-side override.

20 Claims, 3 Drawing Sheets

(56) References Cited

U.S. PATENT DOCUMENTS

| | | | |
|---|---|---|---|
| 2012/0144288 A1* | 6/2012 | Caruso et al. | 715/234 |
| 2012/0151308 A1* | 6/2012 | Falkenberg et al. | 715/201 |
| 2012/0192080 A1* | 7/2012 | Lloyd | 715/744 |
| 2012/0288012 A1* | 11/2012 | Staikos et al. | 375/240.25 |
| 2012/0311131 A1* | 12/2012 | Arrasvuori | 709/224 |
| 2013/0067070 A1* | 3/2013 | Rowe | 709/224 |
| 2013/0110623 A1* | 5/2013 | Kilroy et al. | 705/14.53 |
| 2013/0126599 A1* | 5/2013 | Soske et al. | 235/375 |
| 2013/0138507 A1* | 5/2013 | Kumar et al. | 705/14.54 |
| 2013/0254180 A1* | 9/2013 | McFarlane et al. | 707/706 |
| 2014/0026082 A1* | 1/2014 | Dodson et al. | 715/760 |
| 2014/0164351 A1* | 6/2014 | Grant et al. | 707/710 |
| 2014/0164910 A1* | 6/2014 | Leue et al. | 715/236 |
| 2014/0189110 A1* | 7/2014 | Chakra et al. | 709/224 |
| 2014/0195771 A1* | 7/2014 | Adderly et al. | 711/205 |
| 2014/0281918 A1* | 9/2014 | Wei et al. | 715/234 |

OTHER PUBLICATIONS

ADPERFECT, "Dynamic Data Triggers", retrieved Apr. 11, 2013, 2 pages, Media Management Technologies, Inc., <http://adperfect.co.uk/solutions/online-advertising-solutions/dynamic-web-ads/Dynamic-Data-Triggers/>.

IBM, "Method and Apparatus for Adaptively Loading Web Content Oriented by User Behavior at Client-side", http://ip.com/pubview. IPCOM000184979D, Jul. 7, 2009, 8 pages, IP.COM.

\* cited by examiner

USER-INFLUENCED PAGE LOADING OF WEB CONTENT

BACKGROUND

Embodiments of the present invention generally relate to web content. More particularly, embodiments relate to user-influenced page loading of web content.

A typical web browsing experience may involve using a web browser running on a client device to request web pages from remote servers in response to user interactions with the web browser. A given web page may have, for example, various portlets, wherein certain the order in which the portlets of the page are loaded into the browser may be a function of factors such as the page design and the network connection speed/quality. Certain portlets, however, may be of more interest to the end user than others. As a result, the end user may be forced to spend idle time waiting for the portlet of interest to load, which may have a negative impact on the browsing experience.

BRIEF SUMMARY

Embodiments may include a computer program product having a computer readable storage medium and computer usable code stored on the computer readable storage medium. If executed by a processor, the computer usable code may cause a computer to identify a usage pattern for web content having a plurality of components and receive a web response from a server, wherein the web response is to include the web content. The computer usable code, if executed, may also cause a computer to conduct a client-side override of a load order of the plurality of components based on the usage pattern.

Embodiments may also include a computer implemented method in which a usage pattern is identified for web content having a plurality of components, wherein the usage pattern includes one or more of a user-specific visitation history, a statistical visitation history, user role data, time data, location data, attention area data, device type data and browser type data. The method may also provide for generating a cookie based on the usage pattern, storing the usage pattern to a learning repository, and receiving a web response from a server, wherein the web response includes the web content. Additionally, the cookie may be used to conduct a client-side override of a load order of the plurality of components, and the usage pattern may be updated in the learning repository based on one or more subsequent accesses of the web content.

Embodiments may include a computer program product having a computer readable storage medium and computer usable code stored on the computer readable storage medium. If executed by a processor, the computer usable code may cause a computer to identify a usage pattern for web content having a plurality of components, wherein the usage pattern is to include one or more of a user-specific visitation history, a statistical visitation history, user role data, time data, location data, attention area data, device type data and browser type data. The computer usable code may also cause a computer to generate a cookie based on the usage pattern, store the usage pattern to a learning repository, and receive a web response from a server, wherein the web response is to include the web content. Additionally, the computer usable code may cause a computer to use the cookie to conduct a client-side override of a load order of the plurality of components and update the usage pattern in the learning repository based on one or more subsequent accesses of the web content.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
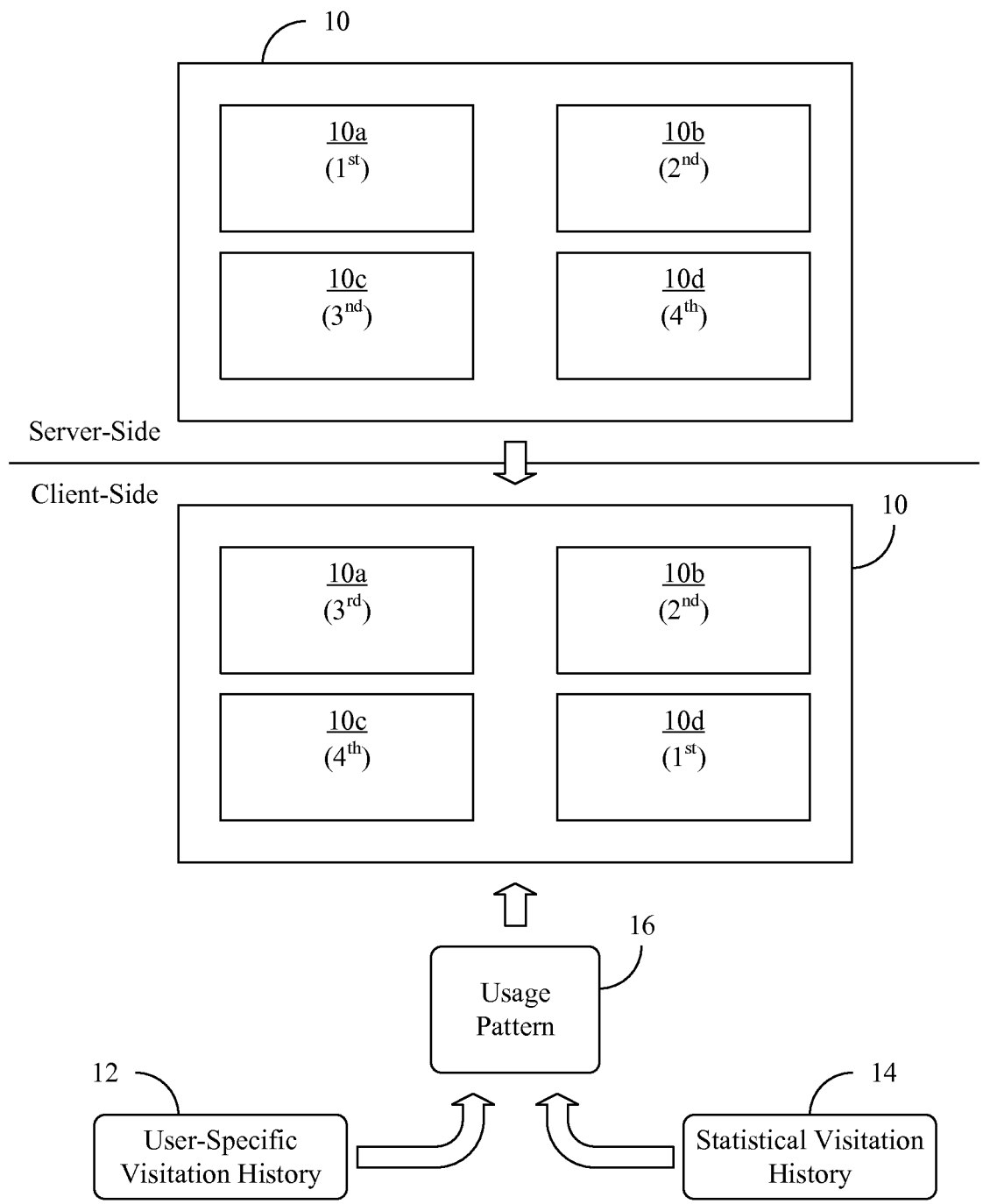
FIG. 1 is a block diagram of an example of an approach to conducting client-side overrides of load order according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, web content 10 (10a-10d) is shown, wherein the web content 10 may represent a web page, portal, application, etc., that may be sent to a client device in response to a web request from the client device (e.g., in a "pull" scenario) and/or in response to another event/condition (e.g., in a "push" scenario). The web content 10 may be sent from one or more servers (e.g., "server-side") to the client device (e.g., "client-side") over a network connection that may be wired, wireless, or any combination thereof. The illustrated web content 10 has a plurality of components such as, for example, widgets, portlets, gadgets, etc., wherein the components may have a natural and/or predefined load order (e.g., default load order) that is a function of the design of the web content, the speed and/or quality of the network connection to the client device, and so forth. In the illustrated example, the default load order would result in a first component 10a being loaded in the browser first, a second component 10b being loaded in the browser second, a third component 10c being loaded in the browser third, and a fourth component 10d being loaded in the browser fourth. Other default load orders may also occur either naturally or by design.

Of particular note is that an end user of the client device may be most interested in a particular component such as, for example, the fourth component 10d. The default load order in such a case, however, may force the user to wait for the entire web page to be loaded in the browser before the end user may view and/or interact with the fourth component 10d. The illustrated approach uses information such as a user-specific visitation history 12, a statistical visitation history 14, and so forth, with respect to the web content 10, to determine a user-influenced usage pattern 16 for the web content 10. The usage pattern 16 may include, for example, user role data (e.g., administrator, business, personal), time data, location data, attention area (e.g., "heat map") data, device type data, browser type data, and so forth. For example, the time data may indicate that certain components of the web content 10 are of greater interest to the user than other components at a particular time of day, week, year, etc. Similarly, the location data may indicate that certain components of the web content 10 are of greater interest to the user than other components when the client device is in a particular geographic location.

As will be discussed in greater detail, a client-side override of the load order of the web content 10 may be conducted based on the usage pattern 16. For example, the client-side override may cause the fourth component 10d to load in the browser first, the second component 10b to load in the browser second, the first component 10a to load in the browser third, and the third component 10c to load in the browser fourth. The load order may be modified by adjusting the order in which components are requested from the server, adjusting the order in which received components are displayed in the browser, instructing the server to load the components in a particular order, and so forth, wherein various techniques such as cookies and/or document object model (DOM) parsing may be used to implement the adjustments and/or instructions. As a result, the illustrated approach enables the end user to more quickly view and/or interact with the content that is of greatest interest. Of particular note is that the server need not be aware of the client-side override of the load order.

Figure 2:
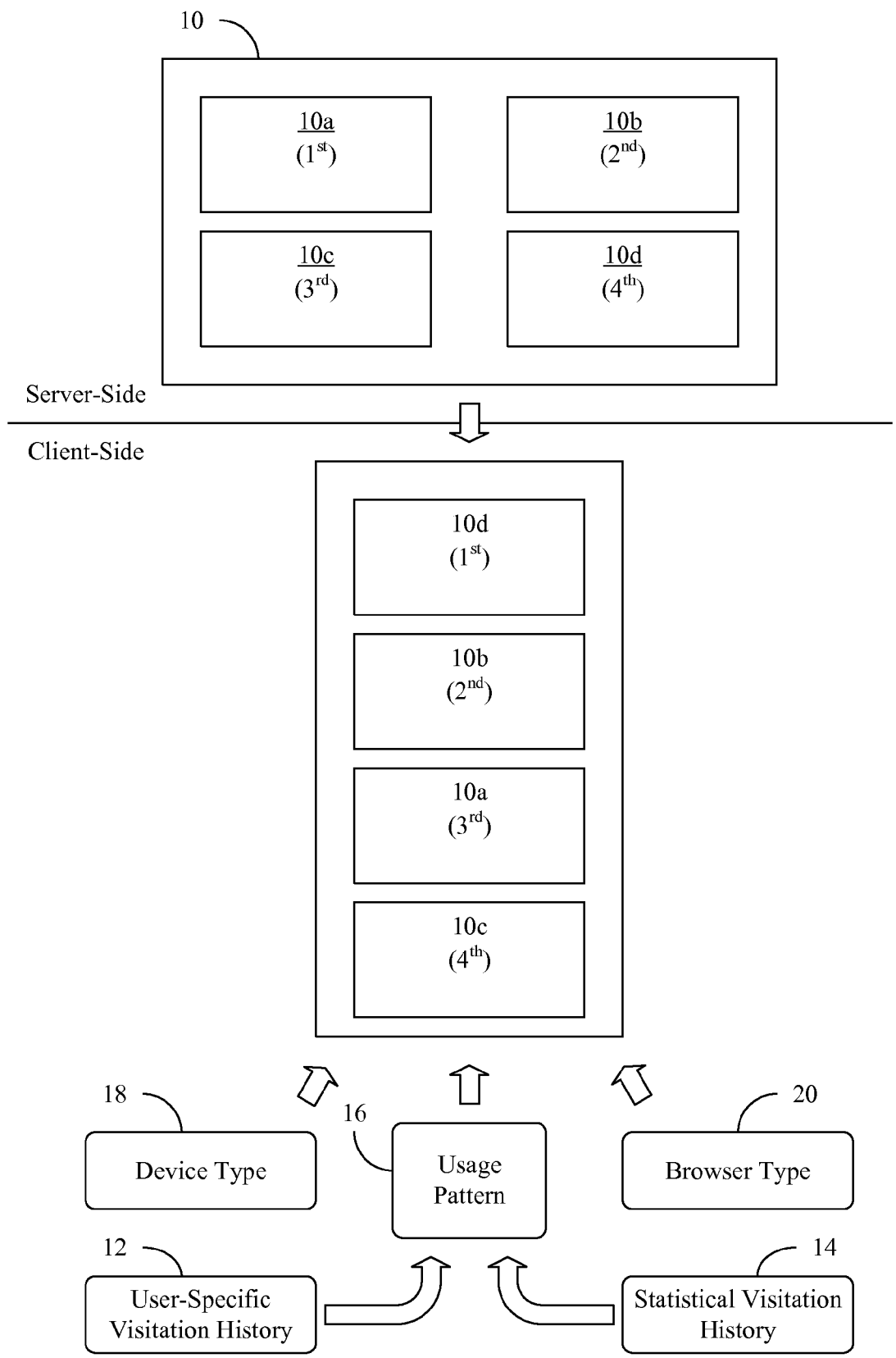
FIG. 2 is a block diagram of an example of an approach to conducting client-side overrides of relative display position according to an embodiment.

FIG. 2 demonstrates another example in which the web content 10 is sent to a client device for display in a browser. In the illustrated example, device type data 18 and/or browser type data 20 may be used in addition to the usage pattern 16 to override the relative display position of the plurality of components. Such an approach may be useful for smaller handheld client devices such as, for example, smart phones, tablets, etc., that have a limited display area. In the illustrated example, the client-side override causes the fourth component 10d to be displayed at the top of the browser interface, the second component 10b to be displayed beneath the fourth component 10d, the first component 10a to be displayed beneath the second component, and the third component 10c to be displayed at the bottom of the browser interface.

Figure 3:
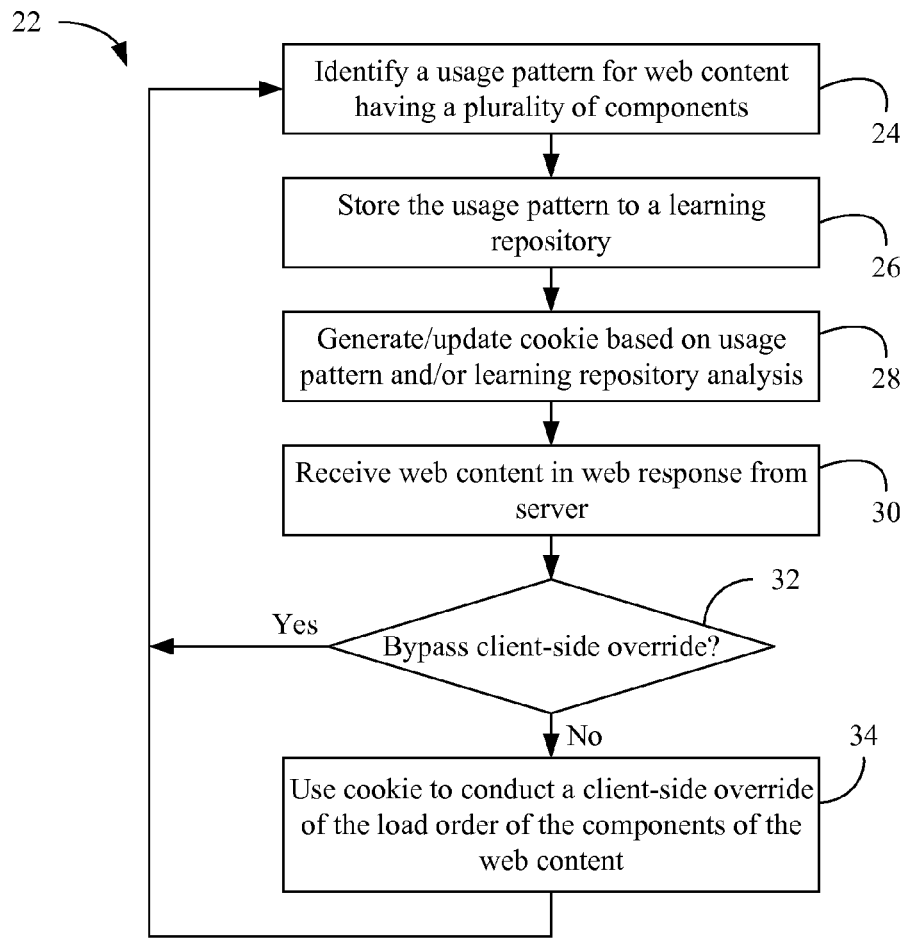
FIG. 3 is a flowchart of an example of an approach to conducting client-side overrides according to an embodiment.

FIG. 3 shows a method 22 of conducting client-side overrides. Illustrated processing block 24 provides for identifying a usage pattern for web content having a plurality of components. The components may include, for example, widgets, portlets, gadgets, etc., or any combination thereof. Block 24 may take into consideration a number of factors such as, for example, a user-specific visitation history, a statistical visitation history (e.g., crowd-based, demographic-based), user role data, time data, location data, attention area data, device type data, browser type data, and so forth. The usage pattern may be stored to a learning repository at block 26, wherein illustrated block 28 generates and/or updates a cookie based on the usage pattern. The cookie generation/update may also be based on an analysis of the learning repository. For example, certain trends may be identified by monitoring the visitation history over time (e.g., gradual increase of interest in a particular component, gradual decrease of interest in another component, etc.), wherein those trends may be an output of the learning repository analysis.

The web content may be received in a web response from one or more servers at block 30. As already noted, the web response may be associated with a previous web request from a client device, a server-side event and/or condition, and so forth. Illustrated block 32 determines whether a client-side override is to be bypassed. The determination at block 32 may involve receiving configuration input via a user input, retrieving previously provided configuration input, etc., and using the configuration input to determine whether the client-side override has been authorized. The configuration input may be time-specific, location-specific, device-specific, etc., or any combination thereof. The configuration input may therefore take the form of one or more user preferences and/or settings related to the received web content in particular, related to web content of a particular type, related to all web content, and so forth. If no bypass condition is detected, illustrated block 34 uses the cookie to conduct a client-side override of the load order for the components of the web content.

In one example, a set of relative weights may be determined for the plurality of components based on the usage pattern. Thus, an expression such as the following may be used to obtain weighted results.

% of priority to display=weight_1/(weight_1+
    weight_2+ . . . +weight_n)

where n is the number of components on the page/display

The relative weights may be stored to the cookie. Other techniques such as DOM parsing may also be used to conduct the client-side override of the load order. Moreover, block 34 may provide for overriding the relative display position of the plurality of components based on the device type data, the browser type data, and so forth, as already discussed.

Figure 4:
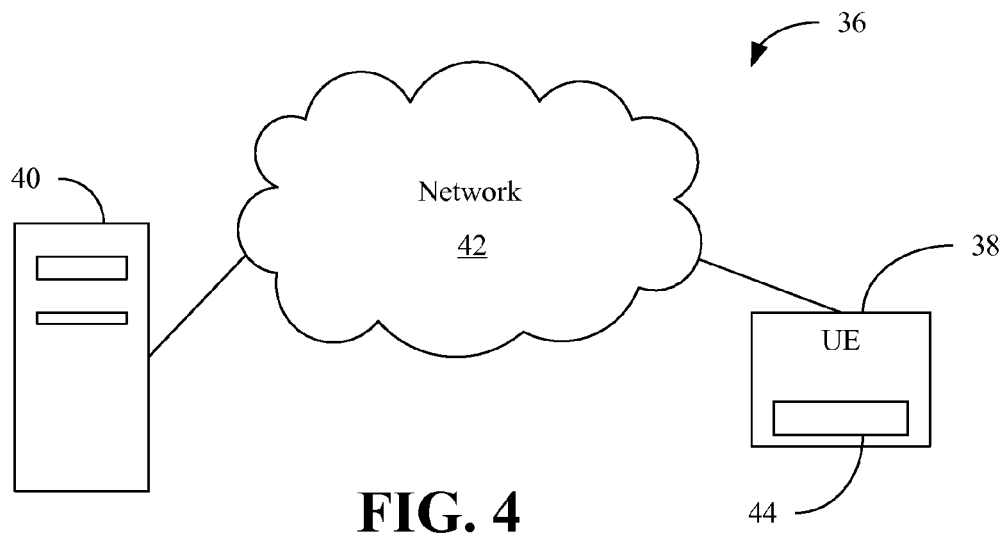
FIG. 4 is a block diagram of an example of a networking architecture according to an embodiment.

Turning now to FIG. 4, a networking architecture 36 is shown in which a user equipment (UE) device 38 (e.g., client device) is configured to receive web content from one or more servers such as a server 40 via a network 42. In the illustrated example, the server 40 can have stored thereon hypertext markup language (HTML) and other markup language-encoded content, as well as databases and applications such as widgets, portlets, gadgets, etc., (e.g., web content). The network 42 may itself include any suitable combination of servers, access points, routers, base stations, mobile switching centers, public switching telephone network (PSTN) components, etc., to facilitate communication between the UE device 38 and the server 40. The status and/or condition of the network 42 may impact the speed at which the web content is delivered to the UE device 38, as well as the load order of the various components of the web content.

The UE device 38 may include a user influence module 44 configured to conduct client-side overrides of web component load orders and relative display positions. More particularly, the user influence module 44 may identify usage patterns for web content having a plurality of components and receive web responses from the server 40, wherein the web responses include the web content. In one example, the UE device also includes a learning repository to track and analyze usage patterns over time. The user influence module 44 may also conduct client-side overrides of load orders of the components based on the usage patterns. In addition, the illustrated user influence module 44 may override relative display positions of the components based on factors such as device type, browser type, and so forth.

Techniques described herein may therefore enhance the web browsing experience under varying network conditions by learning user behavior and prioritizing the loading of web elements/components based on the learned behavior. Moreover, any need to modify server elements or use web content managers may be obviated due to the client-side nature of the techniques described herein. Additionally, the integrity of the web content rendering may be maintained as originally intended by the web developer (e.g., all components may still be rendered, albeit in a different order).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product comprising:
   a non-transitory computer readable storage medium; and
   computer usable code stored on the non-transitory computer readable storage medium, where, if executed by a processor, the computer usable code causes a computer to:
   identify a usage pattern for web content having a plurality of components, wherein the usage pattern is to include one or more of a user-specific visitation history, a statistical visitation history, user role data, time data, location data, attention area data, device type data and browser type data;
   generate a cookie based on the usage pattern;
   store the usage pattern to a learning repository;
   receive a web response from a server, wherein the web response is to include the web content;

use the cookie to conduct a client-side override of a load order of the plurality of components, wherein the client-side override of the load order comprises at least one of adjusting the order in which the plurality of components are requested from the server or instructing the server to load the plurality of components in a particular order; and update the usage pattern in the learning repository based on one or more subsequent accesses of the web content.

2. The computer program product of claim 1, wherein the computer usable code, if executed, causes a computer to:
determine relative weights for the plurality of components based on the usage pattern; and
store the relative weights to the cookie.

3. The computer program product of claim 1, wherein the computer usable code, if executed, causes a computer to:
receive configuration input via a user interface; and
determine whether to conduct the client-side override based on the configuration input.

4. The computer program product of claim 1, wherein the computer usable code, if executed, causes a computer to override a relative display position of the plurality of components based on one or more of the device type data and the browser type data.

5. The computer program product of claim 1, wherein the client-side override is to be conducted with respect to the load order of one or more of a widget, a portlet and a gadget.

6. A computer implemented method comprising:
identifying a usage pattern for web content having a plurality of components, wherein the usage pattern includes one or more of a user-specific visitation history, a statistical visitation history, user role data, time data, location data, attention area data, device type data and browser type data;
generating a cookie based on the usage pattern;
storing the usage pattern to a learning repository;
receiving a web response from a server, wherein the web response includes the web content;
using the cookie to conduct a client-side override of a load order of the plurality of components, wherein the client-side override of the load order comprises at least one of adjusting the order in which the plurality of components are requested from the server or instructing the server to load the plurality of components in a particular order; and
updating the usage pattern in the learning repository based on one or more subsequent accesses of the web content.

7. The method of claim 6, further including:
determining relative weights for the plurality of components based on the usage pattern; and
storing the relative weights to the cookie.

8. The method of claim 6, further including:
receiving configuration input via a user interface; and
determining whether to conduct the client-side override based on the configuration input.

9. The method of claim 6, further including overriding a relative display position of the plurality of components based on one or more of the device type data and the browser type data.

10. The method of claim 6, wherein the client-side override is conducted with respect to one or more of a widget, a portlet and gadget.

11. A computer program product comprising:
a non-transitory computer readable storage medium; and
computer usable code stored on the non-transitory computer readable storage medium, where, if executed by a processor, the computer usable code causes a computer to:
identify a usage pattern for web content having a plurality of components;
receive a web response from a server, wherein the web response is to include the web content; and
conduct a client-side override of a load order of the plurality of components based on the usage pattern, wherein the client-side override of the load order comprises at least one of adjusting the order in which the plurality of components are requested from the server or instructing the server to load the plurality of components in a particular order.

12. The computer program product of claim 11, wherein the computer usable code, if executed, causes a computer to generate a cookie based on the usage pattern, and wherein the cookie is to be used to conduct the client-side override.

13. The computer program product of claim 11, wherein the computer usable code, if executed, causes a computer to store the usage pattern to a learning repository.

14. The computer program product of claim 13, wherein the computer usable code, if executed, causes a computer to update the usage pattern in the learning repository based on one or more subsequent accesses of the web content.

15. The computer program product of claim 11, wherein the computer usable code, if executed, causes a computer to determine relative weights for the plurality of components based on the usage pattern, and wherein the relative weights are used to conduct the client-side override.

16. The computer program product of claim 11, wherein the computer usable code, if executed, causes a computer to:
receive configuration input via a user interface; and
determine whether to conduct the client-side override based on the configuration input.

17. The computer program product of claim 11, wherein the usage pattern is to include one or more of a user-specific visitation history and a statistical visitation history.

18. The computer program product of claim 11, wherein the usage pattern is to include one or more of user role data, time data, location data, attention area data, device type data and browser type data.

19. The computer program product of claim 18, wherein the computer usable code, if executed, causes a computer to override a relative display position of the plurality of components based on one or more of the device type data and the browser type data.

20. The computer program product of claim 11, wherein the client-side override is to be conducted with respect to one or more of a widget, a portlet and a gadget.

* * * * *